US008914836B2

(12) United States Patent
Shivadas et al.

(10) Patent No.: US 8,914,836 B2
(45) Date of Patent: Dec. 16, 2014

(54) SYSTEMS, METHODS, AND COMPUTER PROGRAM PRODUCTS FOR LOAD ADAPTIVE STREAMING (71) Applicant: Sonic IP, Inc., Santa Clara, CA (US)

(72) Inventors: Abhishek Shivadas, San Diego, CA (US); Auke S. Van Der Schaar, Los Angeles, CA (US)

(73) Assignee: Sonic IP, Inc., San Diego, CA (US)

( * ) Notice: Subject to any disclaimer, the term of this patent is extended or adjusted under 35 U.S.C. 154(b) by 0 days.

(21) Appl. No.: 13/631,118

(22) Filed: Sep. 28, 2012

(65) Prior Publication Data

US 2014/0096171 A1    Apr. 3, 2014

(51) Int. Cl.
H04N 7/173    (2011.01)
H04N 21/27    (2011.01)

(52) U.S. Cl.
CPC .................................... *H04N 21/27* (2013.01)
USPC .......................................... 725/109; 725/110

(58) Field of Classification Search
CPC .................................................... H04N 21/04
USPC .................................. 725/109, 110, 115, 145
See application file for complete search history.

(56) References Cited

U.S. PATENT DOCUMENTS

| 5,361,332 A | 11/1994 | Yoshida et al. |
| 5,404,436 A | 4/1995 | Hamilton |
| 5,479,303 A | 12/1995 | Suzuki et al. |
| 5,717,816 A | 2/1998 | Boyce et al. |
| 5,867,625 A | 2/1999 | Mclaren |
| 5,887,110 A | 3/1999 | Sakamoto et al. |
| 5,946,446 A | 8/1999 | Yanagihara |
| 6,018,611 A | 1/2000 | Nogami et al. |
| 6,031,622 A | 2/2000 | Ristow et al. |
| 6,047,100 A | 4/2000 | McLaren |
| 6,058,240 A | 5/2000 | McLaren |
| 6,097,877 A | 8/2000 | Katayama et al. |
| 6,155,840 A | 12/2000 | Sallette |
| 6,195,388 B1 | 2/2001 | Choi et al. |
| 6,222,981 B1 | 4/2001 | Rijckaert |
| 6,292,621 B1 | 9/2001 | Tanaka et al. |
| 6,389,218 B2 | 5/2002 | Gordon et al. |
| 6,418,270 B1 | 7/2002 | Steenhof et al. |
| 6,466,733 B1 | 10/2002 | Kim |
| 6,510,554 B1 | 1/2003 | Gordon et al. |

(Continued)

FOREIGN PATENT DOCUMENTS

| EP | 813167 A2 | 12/1997 |
| EP | 1553779 A1 | 7/2005 |

(Continued)

OTHER PUBLICATIONS

Akhshabi et al., "An Experimental Evaluation of Rate-Adaptation Algorithms in Adaptive Streaming over HTTP", MMSys'11, Feb. 24-25, 2011, 12 pgs.

(Continued)

*Primary Examiner* — Benjamin R Bruckart
*Assistant Examiner* — Michael M Nguyen
(74) *Attorney, Agent, or Firm* — KPPB LLP (57) ABSTRACT Methods, systems, and computer program products that allow for the load adaptive downloading, processing, and rendering of video by a video processing client, where the downloading is adaptive to the processing load of a computing system on which a video processing client operates.

36 Claims, 6 Drawing Sheets

(56) References Cited

U.S. PATENT DOCUMENTS

| | | |
|---|---|---|
| 6,621,979 B1 | 9/2003 | Eerenberg et al. |
| 6,658,056 B1 | 12/2003 | Duruöz et al. |
| 6,807,306 B1 | 10/2004 | Girgensohn et al. |
| 6,859,496 B1 | 2/2005 | Boroczky et al. |
| 6,956,901 B2 | 10/2005 | Boroczky et al. |
| 6,965,724 B1 | 11/2005 | Boccon-Gibod et al. |
| 7,023,924 B1 | 4/2006 | Keller et al. |
| 7,231,132 B1 | 6/2007 | Davenport |
| 7,242,772 B1 | 7/2007 | Tehranchi |
| 7,478,325 B2 | 1/2009 | Foehr |
| 7,720,352 B2 | 5/2010 | Belknap et al. |
| 7,962,942 B1 | 6/2011 | Craner |
| 7,991,156 B1 | 8/2011 | Miller |
| 8,023,562 B2 | 9/2011 | Zheludkov et al. |
| 8,046,453 B2 | 10/2011 | Olaiya |
| 8,054,880 B2 | 11/2011 | Yu et al. |
| 8,065,708 B1 | 11/2011 | Smyth et al. |
| 8,225,061 B2 | 7/2012 | Greenebaum |
| 8,233,768 B2 | 7/2012 | Soroushian et al. |
| 8,249,168 B2 | 8/2012 | Graves |
| 8,265,168 B1 | 9/2012 | Masterson et al. |
| 8,270,473 B2 | 9/2012 | Chen et al. |
| 8,270,819 B2 | 9/2012 | Vannier |
| 8,289,338 B2 | 10/2012 | Priyadarshi et al. |
| 8,291,460 B1* | 10/2012 | Peacock .................. 725/93 |
| 8,311,115 B2 | 11/2012 | Gu et al. |
| 8,321,556 B1 | 11/2012 | Chatterjee et al. |
| 8,386,621 B2 | 2/2013 | Park |
| 8,412,841 B1 | 4/2013 | Swaminathan et al. |
| 8,456,380 B2 | 6/2013 | Pagan |
| 8,472,792 B2 | 6/2013 | Butt |
| 8,510,303 B2 | 8/2013 | Soroushian et al. |
| 8,515,265 B2 | 8/2013 | Kwon et al. |
| 2002/0136298 A1 | 9/2002 | Anantharamu et al. |
| 2003/0002578 A1 | 1/2003 | Tsukagoshi et al. |
| 2003/0152370 A1 | 8/2003 | Otomo et al. |
| 2003/0163824 A1 | 8/2003 | Gordon et al. |
| 2003/0231863 A1 | 12/2003 | Eerenberg et al. |
| 2003/0231867 A1 | 12/2003 | Gates et al. |
| 2003/0233464 A1 | 12/2003 | Walpole et al. |
| 2003/0236836 A1 | 12/2003 | Borthwick |
| 2003/0236907 A1 | 12/2003 | Stewart et al. |
| 2004/0093618 A1 | 5/2004 | Baldwin et al. |
| 2004/0136698 A1 | 7/2004 | Mock |
| 2004/0158878 A1* | 8/2004 | Ratnakar et al. .............. 725/150 |
| 2004/0184534 A1 | 9/2004 | Wang |
| 2005/0038826 A1 | 2/2005 | Bae et al. |
| 2005/0108320 A1 | 5/2005 | Lord |
| 2005/0114896 A1 | 5/2005 | Hug |
| 2005/0193070 A1 | 9/2005 | Brown et al. |
| 2005/0193322 A1 | 9/2005 | Lamkin et al. |
| 2005/0204289 A1 | 9/2005 | Mohammed et al. |
| 2005/0207442 A1 | 9/2005 | Zoest et al. |
| 2005/0207578 A1 | 9/2005 | Matsuyama et al. |
| 2005/0273695 A1 | 12/2005 | Schnurr |
| 2005/0275656 A1 | 12/2005 | Corbin et al. |
| 2006/0037057 A1 | 2/2006 | Xu |
| 2006/0078301 A1 | 4/2006 | Ikeda et al. |
| 2006/0129909 A1 | 6/2006 | Butt et al. |
| 2006/0173887 A1 | 8/2006 | Breitfeld et al. |
| 2006/0245727 A1 | 11/2006 | Nakano et al. |
| 2006/0259588 A1 | 11/2006 | Lerman et al. |
| 2006/0263056 A1 | 11/2006 | Lin et al. |
| 2007/0031110 A1 | 2/2007 | Rijckaert |
| 2007/0044010 A1 | 2/2007 | Sull et al. |
| 2007/0047901 A1 | 3/2007 | Ando et al. |
| 2007/0083617 A1 | 4/2007 | Chakrabarti et al. |
| 2007/0086528 A1 | 4/2007 | Mauchly et al. |
| 2007/0136817 A1 | 6/2007 | Nguyen |
| 2007/0140647 A1 | 6/2007 | Kusunoki et al. |
| 2007/0154165 A1 | 7/2007 | Hemmeryckx-Deleersnijder et al. |
| 2007/0168541 A1 | 7/2007 | Gupta et al. |
| 2007/0168542 A1 | 7/2007 | Gupta et al. |
| 2007/0180125 A1 | 8/2007 | Knowles et al. |
| 2007/0217759 A1 | 9/2007 | Dodd |
| 2007/0234391 A1 | 10/2007 | Hunter et al. |
| 2007/0239839 A1 | 10/2007 | Buday et al. |
| 2007/0292107 A1 | 12/2007 | Yahata et al. |
| 2008/0005175 A1 | 1/2008 | Bourke et al. |
| 2008/0066099 A1 | 3/2008 | Brodersen et al. |
| 2008/0086456 A1 | 4/2008 | Rasanen et al. |
| 2008/0086747 A1 | 4/2008 | Rasanen et al. |
| 2008/0120389 A1* | 5/2008 | Bassali et al. .................. 709/207 |
| 2008/0126248 A1 | 5/2008 | Lee et al. |
| 2008/0137736 A1 | 6/2008 | Richardson et al. |
| 2008/0187283 A1 | 8/2008 | Takahashi |
| 2008/0192818 A1 | 8/2008 | DiPietro et al. |
| 2008/0195664 A1 | 8/2008 | Maharajh |
| 2008/0195744 A1 | 8/2008 | Bowra et al. |
| 2008/0256105 A1 | 10/2008 | Nogawa et al. |
| 2008/0263354 A1 | 10/2008 | Beuque |
| 2008/0279535 A1 | 11/2008 | Haque et al. |
| 2008/0310454 A1 | 12/2008 | Bellwood et al. |
| 2008/0310496 A1 | 12/2008 | Fang |
| 2009/0031220 A1 | 1/2009 | Tranchant et al. |
| 2009/0048852 A1* | 2/2009 | Burns et al. .................. 704/503 |
| 2009/0055546 A1 | 2/2009 | Jung et al. |
| 2009/0060452 A1 | 3/2009 | Chaudhri |
| 2009/0066839 A1 | 3/2009 | Jung et al. |
| 2009/0132599 A1 | 5/2009 | Soroushian et al. |
| 2009/0132721 A1 | 5/2009 | Soroushian et al. |
| 2009/0132824 A1 | 5/2009 | Terada et al. |
| 2009/0150557 A1 | 6/2009 | Wormley et al. |
| 2009/0169181 A1 | 7/2009 | Priyadarshi et al. |
| 2009/0178090 A1 | 7/2009 | Oztaskent |
| 2009/0196139 A1 | 8/2009 | Bates et al. |
| 2009/0201988 A1 | 8/2009 | Gazier et al. |
| 2009/0226148 A1 | 9/2009 | Nesvadba et al. |
| 2009/0293116 A1 | 11/2009 | DeMello et al. |
| 2009/0303241 A1 | 12/2009 | Priyadarshi et al. |
| 2009/0307258 A1 | 12/2009 | Priyadarshi et al. |
| 2009/0307267 A1 | 12/2009 | Chen et al. |
| 2009/0310933 A1 | 12/2009 | Lee |
| 2009/0313544 A1 | 12/2009 | Wood et al. |
| 2009/0313564 A1 | 12/2009 | Rottler et al. |
| 2009/0328124 A1 | 12/2009 | Khouzam et al. |
| 2010/0040351 A1 | 2/2010 | Toma et al. |
| 2010/0074324 A1 | 3/2010 | Qian et al. |
| 2010/0083322 A1 | 4/2010 | Rouse |
| 2010/0095121 A1 | 4/2010 | Shetty et al. |
| 2010/0111192 A1 | 5/2010 | Graves |
| 2010/0142917 A1 | 6/2010 | Isaji |
| 2010/0158109 A1 | 6/2010 | Dahlby et al. |
| 2010/0186092 A1 | 7/2010 | Takechi et al. |
| 2010/0189183 A1 | 7/2010 | Gu et al. |
| 2010/0228795 A1 | 9/2010 | Hahn |
| 2010/0235472 A1 | 9/2010 | Sood et al. |
| 2010/0250532 A1 | 9/2010 | Soroushian et al. |
| 2011/0047209 A1 | 2/2011 | Lindholm et al. |
| 2011/0066673 A1* | 3/2011 | Outlaw .................. 709/203 |
| 2011/0080940 A1 | 4/2011 | Bocharov |
| 2011/0082924 A1 | 4/2011 | Gopalakrishnan |
| 2011/0126191 A1 | 5/2011 | Hughes et al. |
| 2011/0142415 A1 | 6/2011 | Rhyu |
| 2011/0145726 A1 | 6/2011 | Wei et al. |
| 2011/0149753 A1* | 6/2011 | Bapst et al. .................. 370/252 |
| 2011/0150100 A1 | 6/2011 | Abadir |
| 2011/0153785 A1 | 6/2011 | Minborg et al. |
| 2011/0197237 A1 | 8/2011 | Turner |
| 2011/0225315 A1 | 9/2011 | Wexler et al. |
| 2011/0225417 A1 | 9/2011 | Maharajh et al. |
| 2011/0239078 A1 | 9/2011 | Luby et al. |
| 2011/0246657 A1* | 10/2011 | Glow .................. 709/231 |
| 2011/0246659 A1 | 10/2011 | Bouazizi |
| 2011/0268178 A1 | 11/2011 | Park et al. |
| 2011/0302319 A1 | 12/2011 | Ha et al. |
| 2011/0305273 A1 | 12/2011 | He et al. |
| 2011/0314176 A1 | 12/2011 | Frojdh et al. |
| 2012/0023251 A1 | 1/2012 | Pyle et al. |
| 2012/0093214 A1 | 4/2012 | Urbach |
| 2012/0170642 A1 | 7/2012 | Braness et al. |
| 2012/0170643 A1 | 7/2012 | Soroushian et al. |
| 2012/0170906 A1 | 7/2012 | Soroushian et al. |
| 2012/0170915 A1 | 7/2012 | Braness et al. |

(56) References Cited

U.S. PATENT DOCUMENTS

| | | | |
|---|---|---|---|
| 2012/0173751 A1 | 7/2012 | Braness et al. | |
| 2012/0179834 A1* | 7/2012 | van der Schaar et al. | 709/231 |
| 2012/0254455 A1 | 10/2012 | Adimatyam et al. | |
| 2012/0278496 A1 | 11/2012 | Hsu | |
| 2012/0307883 A1 | 12/2012 | Graves | |
| 2012/0311094 A1 | 12/2012 | Biderman et al. | |
| 2013/0044821 A1 | 2/2013 | Braness et al. | |
| 2013/0046902 A1 | 2/2013 | Villegas Nuñez et al. | |
| 2013/0061045 A1 | 3/2013 | Kiefer et al. | |
| 2013/0114944 A1 | 5/2013 | Soroushian | |
| 2013/0166765 A1 | 6/2013 | Kaufman | |
| 2013/0166906 A1 | 6/2013 | Swaminathan et al. | |
| 2014/0101722 A1 | 4/2014 | Moore | |
| 2014/0189065 A1 | 7/2014 | van der Schaar et al. | |

FOREIGN PATENT DOCUMENTS

| | | | |
|---|---|---|---|
| JP | 8111842 A | | 4/1996 |
| JP | 09-037225 | | 2/1997 |
| WO | 9613121 | | 5/1996 |
| WO | 9965239 | A2 | 12/1999 |
| WO | 0208948 | A2 | 1/2002 |
| WO | 0235832 | A2 | 5/2002 |
| WO | 2004102571 | A1 | 11/2004 |
| WO | 2007044590 | A2 | 4/2007 |
| WO | 2008042242 | A2 | 4/2008 |
| WO | 2009065137 | A1 | 5/2009 |
| WO | 2010060106 | A1 | 5/2010 |
| WO | 2010/080911 | A1 | 7/2010 |
| WO | 2010122447 | A1 | 10/2010 |
| WO | 2012094171 | A1 | 7/2012 |
| WO | 2012094181 | A2 | 7/2012 |
| WO | 2012094189 | A1 | 7/2012 |

OTHER PUBLICATIONS

Anonymous, "Method for the encoding of a compressed video sequence derived from the same video sequence compressed at a different bit rate without loss of data", ip.com, ip.com No. IPCOM000008165D, May 22, 2012, pp. 1-9.
Author Unknown, "Blu-ray Disc—Wikipedia, the free encyclopedia", printed Oct. 30, 2008 from http://en.wikipedia.org/wiki/Blu-ray_Disc, 11 pgs.
Author Unknown, "Blu-ray Movie Bitrates Here—Blu-ray Forum", printed Oct. 30, 2008 from http://forum.blu-ray.com/showthread.php?t=3338, 6 pgs.
Author Unknown, "O'Reilly—802.11 Wireless Networks: The Definitive Guide, Second Edition", printed Oct. 30, 2008 from http://oreilly.com/catalog/9780596100520, 2 pgs.
Author Unknown, "Tunneling QuickTime RTSP and RTP over HTTP", Published by Apple Computer, Inc.: 1999 (month unknown), 6 pages.
Author Unknown, "Turbo-Charge Your Internet and PC Performance", printed Oct. 30, 2008 from Speedtest.net—The Global Broadband Speed Test, 1 pg.
Author Unknown, "When is 54 Not Equal to 54? A Look at 802.11a, b and g Throughput", printed Oct. 30, 2008 from http://www.oreillynet.com/pub/a/wireless/2003/08/08/wireless?throughput.htm., 4 pgs.
Author Unknown, "White paper, The New Mainstream Wireless LAN Standard", Broadcom Corporation, Jul. 2003, 12 pgs.
Deutscher, "IIS Transform Manager Beta—Using the MP4 to Smooth Task", Retrieved from: https://web.archive.org/web/20130328111303/http://blog.johndeutscher.com/category/smooth-streaming, Blog post of Apr. 17, 2010, 14 pgs.
Gannes, "The Lowdown on Apple's HTTP Adaptive Bitrate Streaming", GigaOM, Jun. 10, 2009, 12 pgs.
Garg et al., "An Experimental Study of Throughput for UDP and VoIP Traffic in IEEE 802.11b Networks", Wireless Communications and Networkings, Mar. 2003, pp. 1748-1753.
Ghosh, "Enhancing Silverlight Video Experiences with Contextual Data", Retrieved from: http://msdn.microsoft.com/en-us/magazine/ee336025.aspx, 15 pgs.
Inlet Technologies, "Adaptive Delivery to iDevices", 2 pages.
Inlet Technologies, "Adaptive delivery to iPhone 3.0", 2 pages.
Inlet Technologies, "HTTP versus RTMP", 3 pages.
Inlet Technologies, "The World's First Live Smooth Streaming Event: The French Open", 2 pages.
Kim, Kyuheon, "MPEG-2 ES/PES/TS/PSI", Kyung-Hee University, Oct. 4, 2010, 66 pages.
Kozintsev et al., "Improving last-hop multicast streaming video over 802.11", Workshop on Broadband Wireless Multimedia, Oct. 2004, pp. 1-10.
Kurzke et al., "Get Your Content Onto Google TV", Google, Retrieved from: http://commondatastorage.googleapis.com/io2012/presentations/live%20to%20website/1300.pdf, 58 pgs.
Lang, "Expression Encoder, Best Practices for live smooth streaming broadcasting", Microsoft Corporation, 20 pgs.
Levkov, "Mobile Encoding Guidelines for Android Powered Devices", Adobe Systems Inc., Addendum B, source and date unknown, 42 pgs.
MSDN, "Adaptive streaming, Expression Studio 2.0", 2 pgs.
Nelson, "Smooth Streaming Deployment Guide", Microsoft Expression Encoder, Aug. 2010, 66 pgs.
Noé, Alexander, "Matroska File Format (under construction !)", Jun. 24, 2007, XP002617671, Retrieved from: http://web.archive.org/web/20070821155146/www.matroska.org/technical/specs/matroska.pdf, Retrieved on Jan. 19, 2011, pp. 1-51.
Ozer, "The 2012 Encoding and Transcoding Buyers' Guide", Streamingmedia.com, Retrieved from: http://www.streamingmedia.com/Articles/Editorial/Featured-Articles/The-2012-Encoding-and-Transcoding-Buyers-Guide-84210.aspx, 2012, 8 pgs.
Pantos, "HTTP Live Streaming, draft-pantos-http-live-streaming-10", IETF Tools, Oct. 15, 2012, Retrieved from: http://tools.ietf.org/html/draft-pantos-http-live-streaming-10, 37 pgs.
Pantos, R., "HTTP Live Streaming: draft-pantos-http-live-streaming-06", Published by the Internet Engineering Task Force (IETF), Mar. 31, 2011, 24 pages.
Papagiannaki et al., "Experimental Characterization of Home Wireless Networks and Design Implications", INFOCOM 2006, 25th IEEE International Conference of Computer Communications, Proceedings, Apr. 2006, 13 pgs.
RGB Networks, "Comparing Adaptive HTTP Streaming Technologies", Nov. 2011, Retrieved from: http://btreport.net/wp-content/uploads/2012/02/RGB-Adaptive-HTTP-Streaming-Comparison-1211-01.pdf, 20 pgs.
Schulzrinne, H. et al., "Real Time Streaming Protocol 2.0 (RTSP): draft-ietfmmusic-rfc2326bis-27", MMUSIC Working Group of the Internet Engineering Task Force (IETF), Mar. 9, 2011, 296 pages.
Siglin, "HTTP Streaming: What You Need to Know", streamingmedia.com, 2010, 16 pages.
Siglin, "Unifying Global Video Strategies, MP4 File Fragmentation for Broadcast, Mobile and Web Delivery", Nov. 16, 2011, 16 pgs.
Tan, Yap-Peng et al., "Video transcoding for fast forward/reverse video playback", IEEE ICIP, 2002, I-713 to I-716.
Wang et al., "Image Quality Assessment: From Error Visibility to Structural Similarity", IEEE Transactions on Image Processing, Apr. 2004, vol. 13, No. 4, pp. 600-612.
Wu, Feng et al., "Next Generation Mobile Multimedia Communications: Media Codec and Media Transport Perspectives", In China Communications, Oct. 2006, pp. 30-44.
Zambelli, Alex, "IIS Smooth Streaming Technical Overview", Microsoft Corporation, Mar. 2009.
European Search Report Application No. EP 08870152, Search Completed May 19, 2011, Mailed May 26, 2011, 9 pgs.
European Search Report for Application 11855103.5, search completed Jun. 26, 2014, 9 pgs.
European Search Report for Application 11855237.1, search completed Jun. 25, 2014, 9 pgs.
Federal Computer Week, "Tool Speeds Info to Vehicles", Jul. 25, 1999, 5 pages.
HTTP Live Streaming Overview, Networking & Internet, Apple, Inc., Apr. 1, 2011, 38 pages.
International Search Report and Written Opinion for International Application PCT/US2011/066927, International Filing Date Dec.

(56) References Cited

OTHER PUBLICATIONS 22, 2011, Report Completed Apr. 3, 2012, Mailed Apr. 20, 2012, 14 pgs.

International Search Report and Written Opinion for International Application PCT/US2011/067167, International Filing Date Dec. 23, 2011, Report Completed Jun. 19, 2012, Mailed Jul. 2, 2012, 11 pgs.

International Search Report for International Application No. PCT/US08/87999, date completed Feb. 7, 2009, date mailed Mar. 19, 2009, 2 pgs.

ITS International, "Fleet System Opts for Mobile Server", Aug. 26, 1999, 1 page.

Lifehacker—Boxqueue Bookmarklet Saves Videos for Later Boxee Watching, printed Jun. 16, 2009 from http://feeds.gawker.com/~r/lifehacker/full/~3/OHvDmrIgZZc/boxqueue-bookmarklet-saves-videos-for-late-boxee-watching, 2 pgs.

Microsoft, Microsoft Media Platform: Player Framework, "Silverlight Media Framework v1.1", 2 pages.

Microsoft, Microsoft Media Platform:Player Framework, "Microsoft Media Platform: Player Framework v2.5 (formerly Silverlight Media Framework)", 2 pages.

Supplementary European Search Report for Application No. EP 10729513, International Filing Date Jan. 7, 2010, Search Completed Dec. 9, 2013, 4 pgs.

The Official Microsoft IIS Site, Smooth Streaming Client, 4 pages.

Written Opinion of the International Searching Authority for International Application No. PCT/US08/87999, date completed Feb. 7, 2009, date mailed Mar. 19, 2009, 4 pgs.

"Adaptive Streaming Comparison", Jan. 28, 2010, 5 pgs.

"Best Practices for Multi-Device Transcoding", Kaltura Open Source Video, 13 pgs.

"Informationweek: Front End: Daily Dose, Internet on Wheels", Jul. 20. 1999, 3 pgs.

"International Search Report and Written Opinion for International Application PCT/US2010/020372", Search Report mailed Mar. 1, 2010, 7 pgs.

"Netflix turns on subtitles for PC, Mac streaming", 3 pgs.

"Supported Media Formats", Supported Media Formats, Android Developers, Nov. 27, 2013, 3 pgs.

"Thread: SSME (Smooth Streaming Medial Element) config.xml review (Smooth Streaming Client configuration file)", 3 pgs.

"Transcoding Best Practices", From movideo, Nov. 27, 2013, 5 pgs.

"Using HTTP Live Streaming", iOS Developer Library, Retrieved from: http://developer.apple.com/library/ios/#documentation/networkinginternet/conceptual/streamingmediaguide/UsingHTTPLiveStreaming/UsingHTTPLiveStreaming.html#//apple_ref/doc/uid/TP40008332-CH102-SW1, 10 pgs.

\* cited by examiner

SYSTEMS, METHODS, AND COMPUTER PROGRAM PRODUCTS FOR LOAD ADAPTIVE STREAMING

BACKGROUND

Adaptive video streaming is a method by which a receiving device or system selects a bitstream from among a set of bitstreams, each representing the same video interval, where the selected bitstream represents the highest quality level that can be sustained by the communications infrastructure and display. Each bitstream in the set of bitstreams may represent a different level, where a higher level corresponds to a higher bitrate and resolution. As a result, the bitstream at a higher level requires more processing time than the bitstream at a next lower level.

Not all platforms will have sufficient processing power to decode, with sufficient speed, the level that can be sustained by the network and display, however. Most notably, low powered personal computers (PCs) (such as laptops and older desktop PCs) may struggle with processing bitstreams at such a level. Furthermore, some computers, especially laptops, use dynamic frequency scaling. This allows the frequency of the central processing unit (CPU) to adapt, depending on the heat and power properties. This will affect the available processing power as well, possibly making it difficult for a computer to handle a bitstream level that is chosen on the basis of network and display capabilities. In addition, the CPUs may be shared with other running processes (programs), which reduces the available processing capacity for video processing. Therefore, the selection of a particular bitstream in an adaptive streaming system needs to consider the available processing power.

BRIEF DESCRIPTION OF THE DRAWINGS/FIGURES

In the drawings, the leftmost digit(s) of a reference number identifies the drawing in which the reference number first appears.

DETAILED DESCRIPTION

An embodiment is now described with reference to the figures, where like reference numbers indicate identical or functionally similar elements. While specific configurations and arrangements are discussed, it should be understood that this is done for illustrative purposes only. A person skilled in the relevant art will recognize that other configurations and arrangements can be used without departing from the spirit and scope of the description. It will be apparent to a person skilled in the relevant art that this can also be employed in a variety of other systems and applications other than what is described herein.

Disclosed herein are methods, systems, and computer program products that allow for the load adaptive downloading, processing, and rendering of video by a video processing client, where the downloading is adaptive to the processing load of a computing system on which a video processing client operates.

Generally, the processing power required to decode and render video streams increases monotonically with bitrate and resolution of the streams. The load adaptive functionality described herein may provide a smooth playback at a specific level, thus avoiding excessive stutter on the client. The load adaptive process chooses an appropriate decode level (i.e., an appropriate bitstream from the set of bitstreams) that is sustainable (i.e. a bitstream that can be decoded in real-time given the current system processing capabilities), and with the best visual quality. An embodiment of the process, which includes a predictive feedback based process, will initially start with no prior knowledge of the video system, and will acquire knowledge by analyzing performance data received from the video system. A decision for the maximum sustainable decode level may be made prior to download of a video segment, and will be based on the recent performance history of the video system. Occasionally, selection of a decode level may, under specific conditions, be followed by flushing some of the already-downloaded video data in an embodiment.

Figure 1:
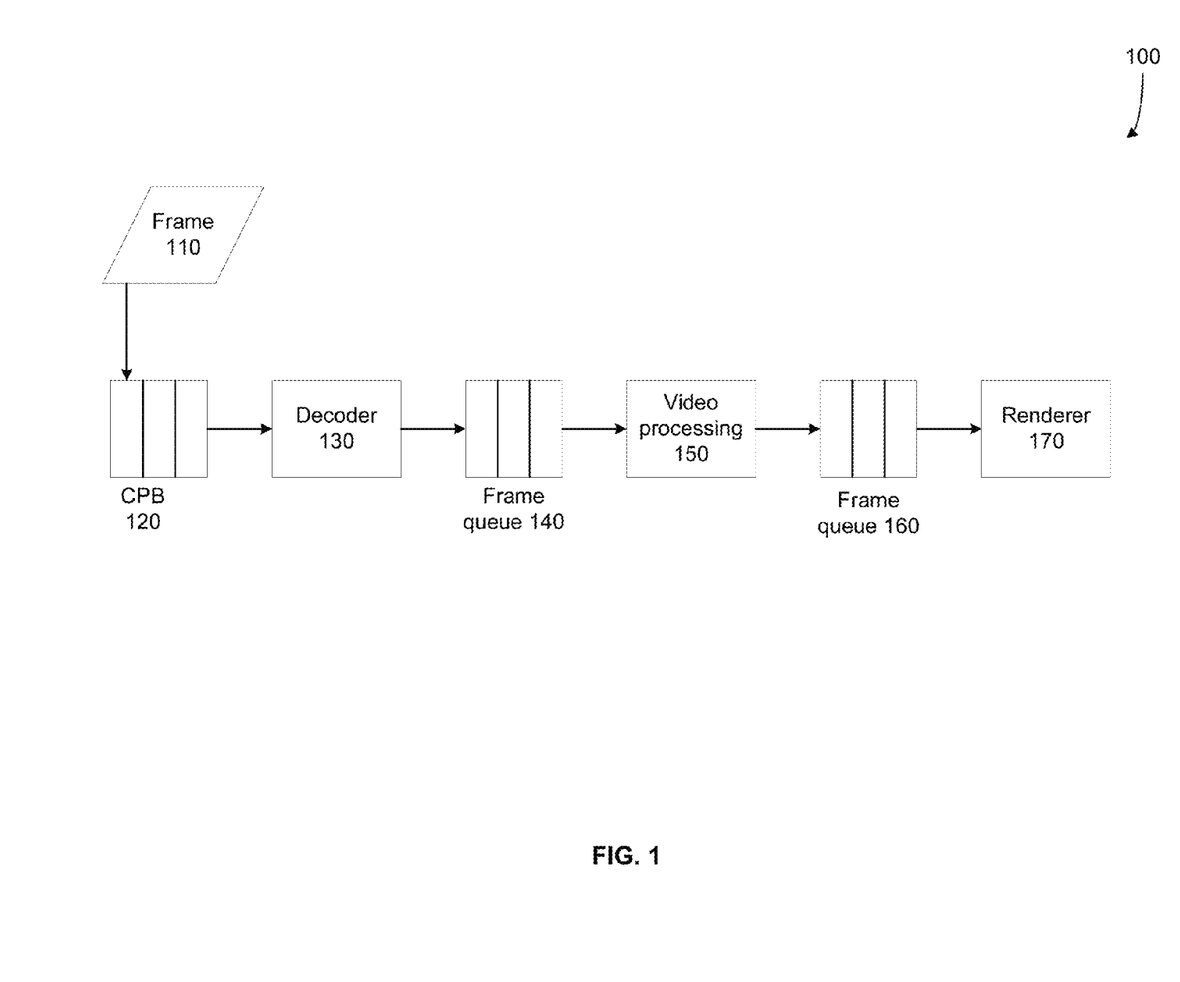
FIG. 1 is a block diagram of an exemplary video system, according to an embodiment.

FIG. 1 illustrates an exemplary video processing system 100 in which load adaptive streaming may take place, according to an embodiment. A video frame 110 is received and placed in a coded picture buffer (CPB) 120. The number of frames held in CPB 120 will vary, depending on the rate at which frames are received and the rate at which they are read out. Video frames that are read from CPB 120 are decoded by video decoder 130. Decoded frames may then be stored in a first frame queue 140. After passing through queue 140, a decoded frame is then processed by video processing module(s) 150. The processing performed by module(s) 150 may include, for example, scaling, format conversion, and filtering operations. Processed frames may then be passed to a renderer 170, via a second frame queue 160.

In an embodiment, the load adaptive streaming process selects an initial playback bitrate from previously stored client configuration information. The client stores the maximum load adaptive decode level previously used during playback. For example, on Windows™, the client can store the maximum load adaptive level in the registry, in an embodiment. In the absence of a previous stored configuration, the load adaptive functionality can start from the lowest level.

From this initial state, a new decode level may be chosen, based on processing conditions, i.e., on the load being placed on the host computing system. There are many indications that could be used to determine whether the system can handle the load. Examples include CPU usage (as measured by the ratio of the amount of time in which the CPU is active to the time spent idle, for example) or the rate or extent of dropping of video frames. CPU usage may be used, but in an embodiment this is not considered as a measure as there is no strong correlation between the dead-line driven nature of the video system (i.e., the requirement for a certain number of frames per unit time) and the average load of a CPU. The rate of dropping frames is a useful measure, although it is reactive. A useful measure would indicate when the load is approaching the limit of a system. A video system must render a frame every frame period. From this follows that, on average, it must produce a frame every frame period, such that the second frame queue is never depleted.

The load-adaptive streaming process as described herein may use, as inputs, one or more of a variety of performance measures relating to the operations and delays of a system such as system 100. The following performance measurements may be used for load adaptive streaming functionality, according to an embodiment. In order to minimize communication overhead between the client video system and the load adaptive streaming process, the measurements may be assembled in the client's video system in a sample collection buffer and relayed to the load adaptive streaming process periodically.

A. Time to deliver a frame: The time to deliver a frame is a measurement of the total system time spent for decoding and video processing operations.

In an embodiment, the excess time to deliver a frame with respect to the frame period (referred to herein as excess frame time) may be used as a comparable measure. If the frame period is 40 ms and the time to deliver a frame is 50 ms then the excess frame time is 10 ms. The excess frame time is −10 ms when the time to deliver a frame is 30 ms. As a video system typically employs a frame queue, the delivery time is averaged over the frames in the queue. As can be concluded from empirical measurements, the time to deliver a frame varies considerably; however as all frames need to be delivered in time, the processing described here needs to consider only the outliers, i.e., the frames that take the longest time to process. In such an embodiment, a sorted list of the largest (or maximum) excess delivery times is maintained; the average of a subset of these maximum values is then calculated. In an embodiment, this subset represents a selected range of these maximum values. This average is used for comparison to a decision threshold. This average may be viewed as an average of a range of maximum excess delivery times. Note that the "excess delivery times" are determined as a function (e.g., the mean) of the delivery times of frames in the second queue in an embodiment.

Figure 2:
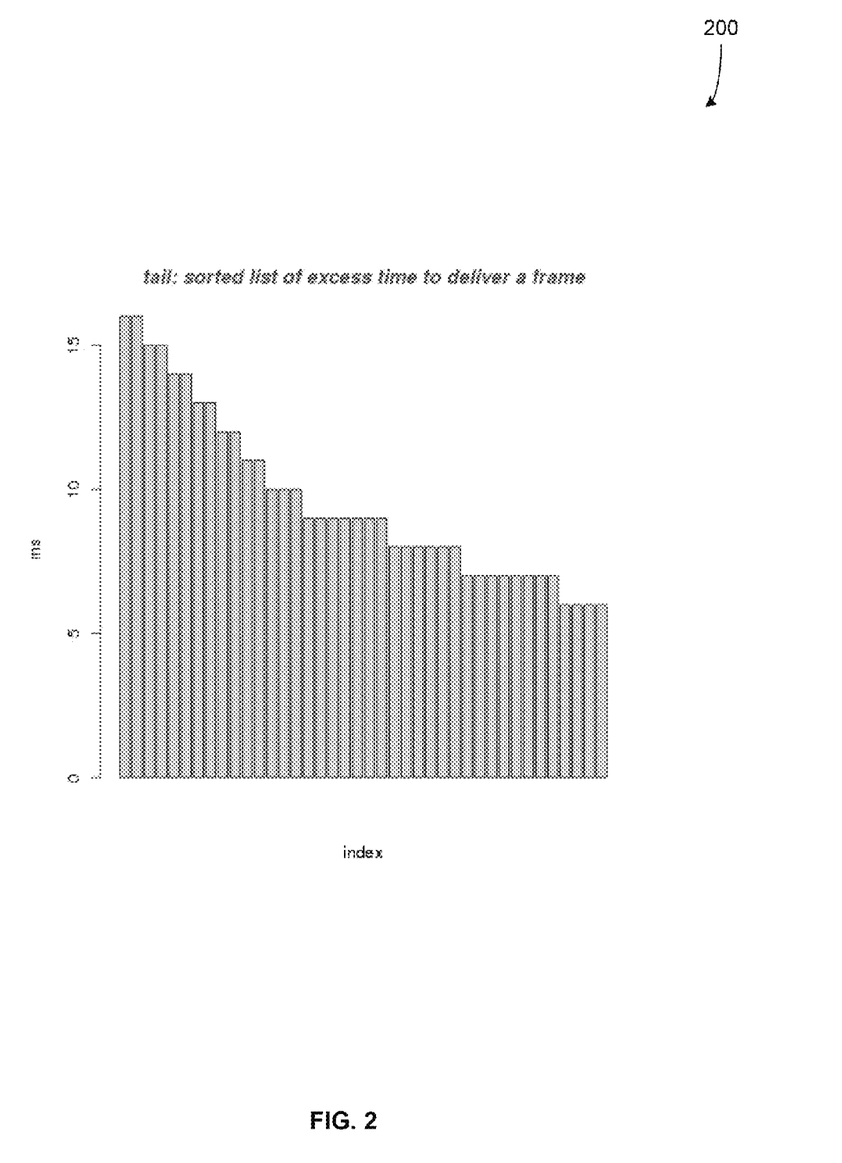
FIG. 2 illustrates a sorted list showing excess times to deliver frames, according to an embodiment.

FIG. 2 illustrates such a sorted list. The height of each vertical bar represents an excess frame delivery time. These heights, or times, may be averaged over a configurable range, for example 2 to 5, to derive an average of a range of maximum excess delivery times. This value may then be compared to a threshold value. There are two thresholds. If this average is below the lower threshold then a higher level can be selected. If this average is exceeding the higher threshold, this implies that the load of the host machine is excessive and leads to a shift to a lower decoding level.

In an embodiment, the difference between the two thresholds is larger than the expected performance increase. The lower threshold may be derived dynamically from the difference in resolution. In addition, in an embodiment, the thresholds may be derived dynamically in the client video system during operation. Alternatively, the thresholds may be configured statically by a remote server. The thresholds may also be stored locally at the client video system, and may be read at startup.

B. Total number of frames in the frame queue: Note that this value is dynamic

C. Dropped frame count over a predetermined period.

D. Current decode level.

E. The amount of video data in download buffers

F. The video resolution for each streaming level.

Figure 3A:
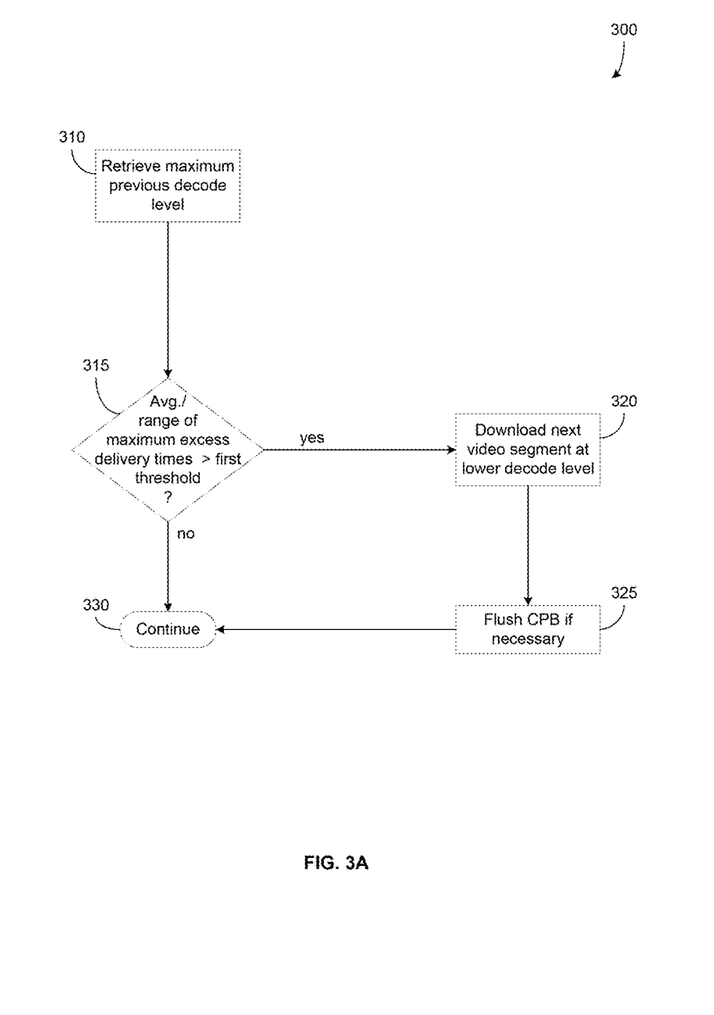
FIG. 3A is a flow chart illustrating the selection of a lower decoding level, according to an embodiment.

The choice of a lower decoding level is illustrated in FIG. 3A, according to an embodiment. At 310, the highest previous decode level is retrieved and is used as the default decode level initially. At 315, a determination is made as to whether the average of the range of maximum excess delivery times is greater than a first threshold value over a predetermined period. If so, then at 320, the next segment of video is downloaded at the next lower decode level. In an embodiment, a waiting period may be imposed before switching to the lower decode level. At 325, the coded picture buffer CPB is flushed. As will be described in greater detail below, this flushing is not generally complete, so that some frames will remain in the CPB after flushing.

Figure 3B:
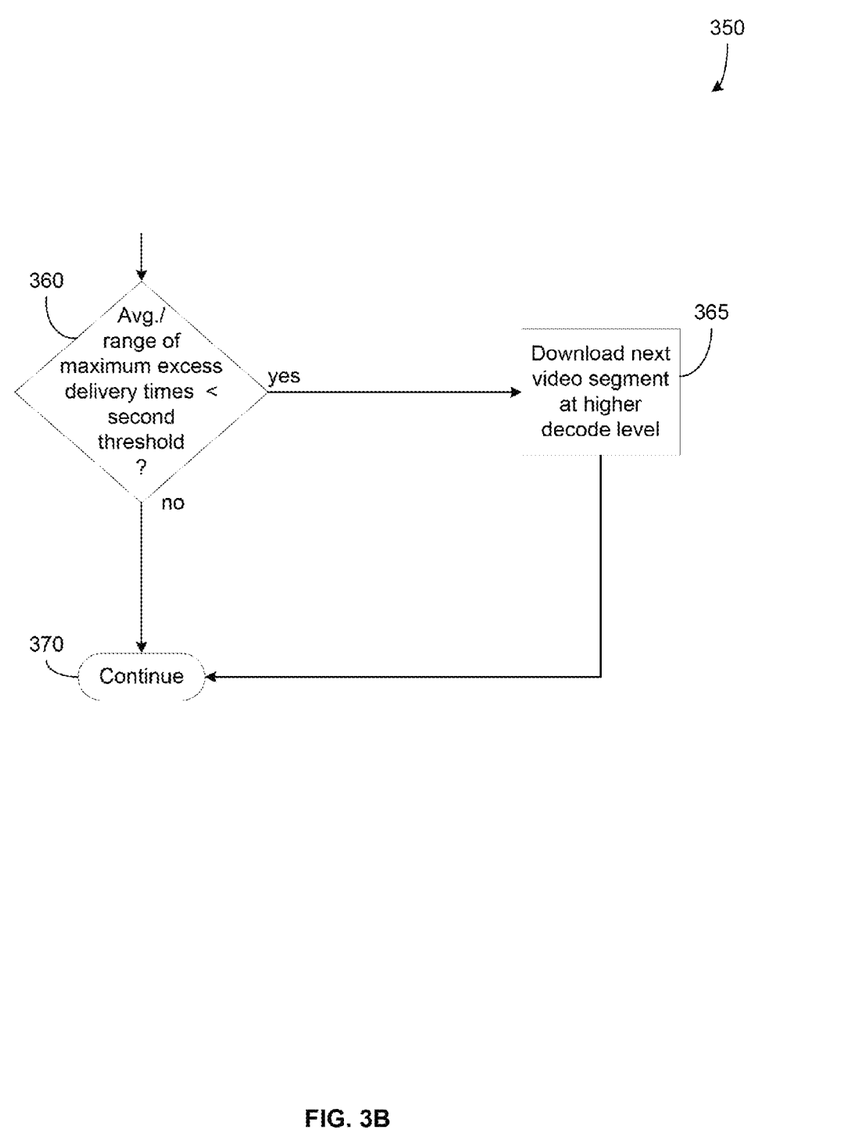
FIG. 3B is a flow chart illustrating the selection of a higher decoding level, according to an embodiment.

The choice of a higher decode level is illustrated in FIG. 3B, according to an embodiment. At 360, a determination is made as to whether the average of the range of maximum excess delivery times is less than a second threshold value over a predetermined time period. If so, then at 365, the next segment of video is downloaded at the next higher decode level.

In an embodiment, a minimum observation period may be implemented, such that a lower decode level is chosen only if the average time to deliver exceeds the threshold for this minimum observation period. In an embodiment, this time period may be zero seconds, but in other embodiments, this minimum observation period may be non-zero. Analogously, another minimum observation period may be implemented, such that a higher decode level is chosen only if the average time to deliver is below the defined threshold for this minimum observation period.

Figure 4:
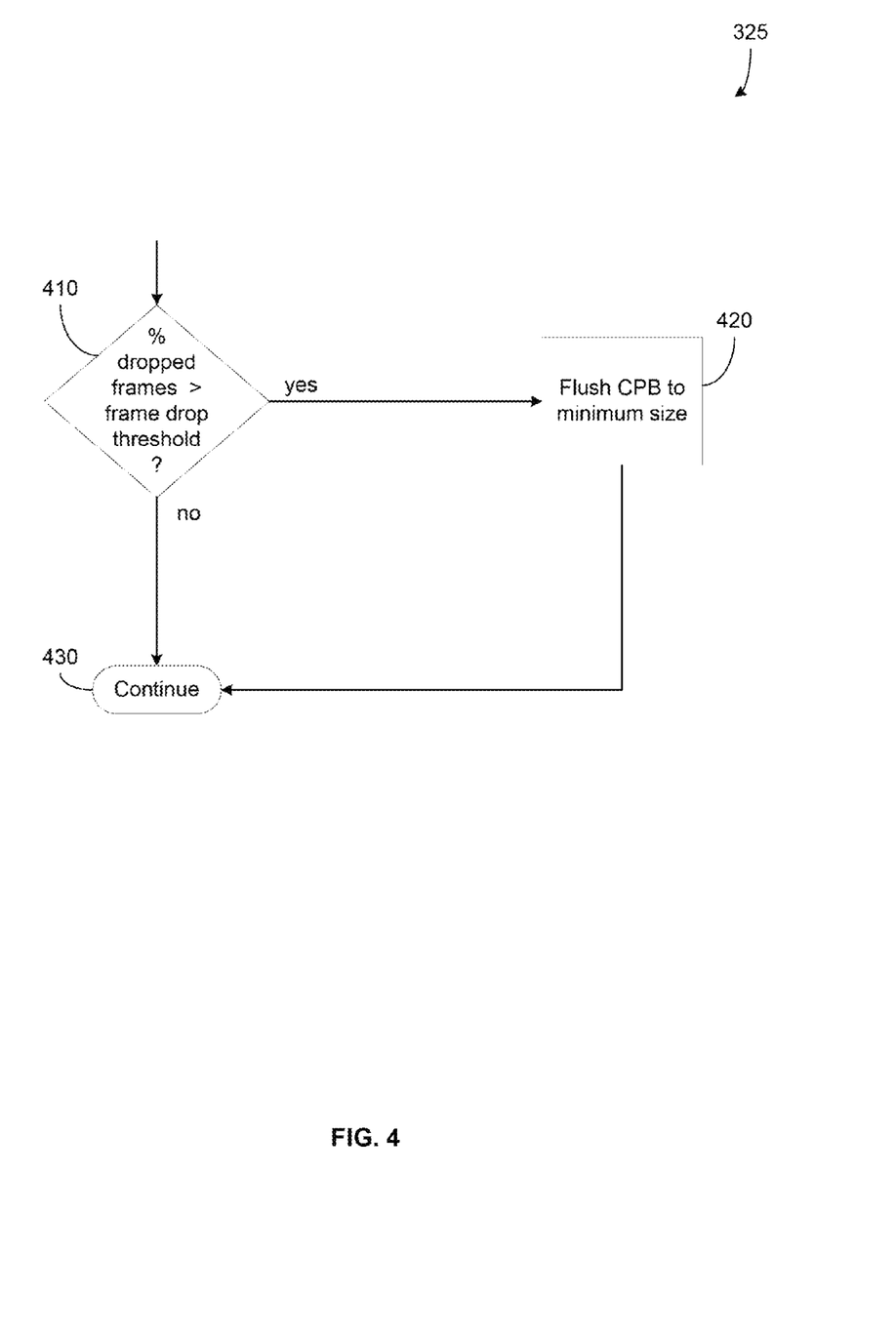
FIG. 4 is a flow chart illustrating the flushing of a coded picture buffer, according to an embodiment.

The flushing of the CPB (325 above) is performed when the proper condition(s) are met, and only performed to a certain extent, according to an embodiment. This is illustrated in FIG. 4. At 410, a determination is made as to whether the percentage of dropped frames exceeds a frame drop threshold. If so, then the frames currently in the pipeline are not being processed quickly enough, and it becomes advantageous to remove some of the frames from the CPB. This flushing of the CPB takes place at 420. In an embodiment, the percentage of dropped frames depends on the total number of frames dropped over a predefined period.

The extent of the flushing may vary according to system conditions. Generally, not every frame will be removed. A flush may be performed when the current level results in dropped frames. In an embodiment, the percentage of dropped frames will determine the aggressiveness of the flush. In such an embodiment, if the percentage of dropped frames is less than 2%, no flush is needed. If the percentage of dropped frames is between 2% and 15%, the CPB is flushed to the extent that 11 seconds of video are kept in the CPB. If the percentage of dropped frames exceeds 15%, the CPB is flushed to the extent that 6 seconds of video are retained in the CPB. In alternative embodiments, the dropped frame threshold percentages may vary and the extent of flushing may vary.

Note that in some video systems, a rate adaptive streaming process may also be in place. In such a context, there may be a relationship between the rate adaptive and load adaptive algorithms. The rate adaptive algorithm may rely on buffering several seconds of video data to avoid re-buffering, whereas the load adaptive algorithm avoids excessive stutter by choosing an appropriate decode level and by sometimes purging downloaded data from the CPB of the client. In an embodiment, the client chooses the lower of the two levels recommended by the rate adaptive process and the load adaptive process.

One or more features disclosed herein may be implemented in hardware, software, firmware, and combinations thereof, including discrete and integrated circuit logic, application specific integrated circuit (ASIC) logic, and microcontrollers, and may be implemented as part of a domain-specific integrated circuit package, or a combination of integrated circuit packages. The term software, as used herein, refers to a computer program product including at least one computer readable medium having computer program logic stored therein to cause a computer system to perform one or more features and/or combinations of features disclosed herein. The computer readable medium may be transitory or non-transitory. An example of a transitory computer readable medium may be a digital signal transmitted over a radio frequency or over an electrical conductor, through a local or wide area network, or through a network such as the Internet. An example of a non-transitory computer readable medium may be a compact disk, a flash memory, RAM, ROM, or other data storage device.

In an embodiment, some or all of the processing described herein may be implemented as software or firmware. Such a software or firmware embodiment is illustrated in the context of a computing system 500 in FIG. 5. System 500 may include one or more central processing unit(s) (CPU), shown as processor(s) 520, and a body of memory 510 that includes one or more non-transitory computer readable media that store computer program logic 540. Memory 510 may be implemented as a read-only memory (ROM) or random access memory (RAM) device, for example. Processor(s) 520 and memory 510 may be in communication using any of several technologies known to one of ordinary skill in the art, such as a bus or a point-to-point interconnect. Computer program logic 540 contained in memory 510 may be read and executed by processor(s) 520. In an embodiment, one or more I/O ports and/or I/O devices, shown collectively as I/O 530, may also be connected to processor(s) 520 and memory 510. In an embodiment, I/O 530 may include the display of the user's computing device.

Figure 5:
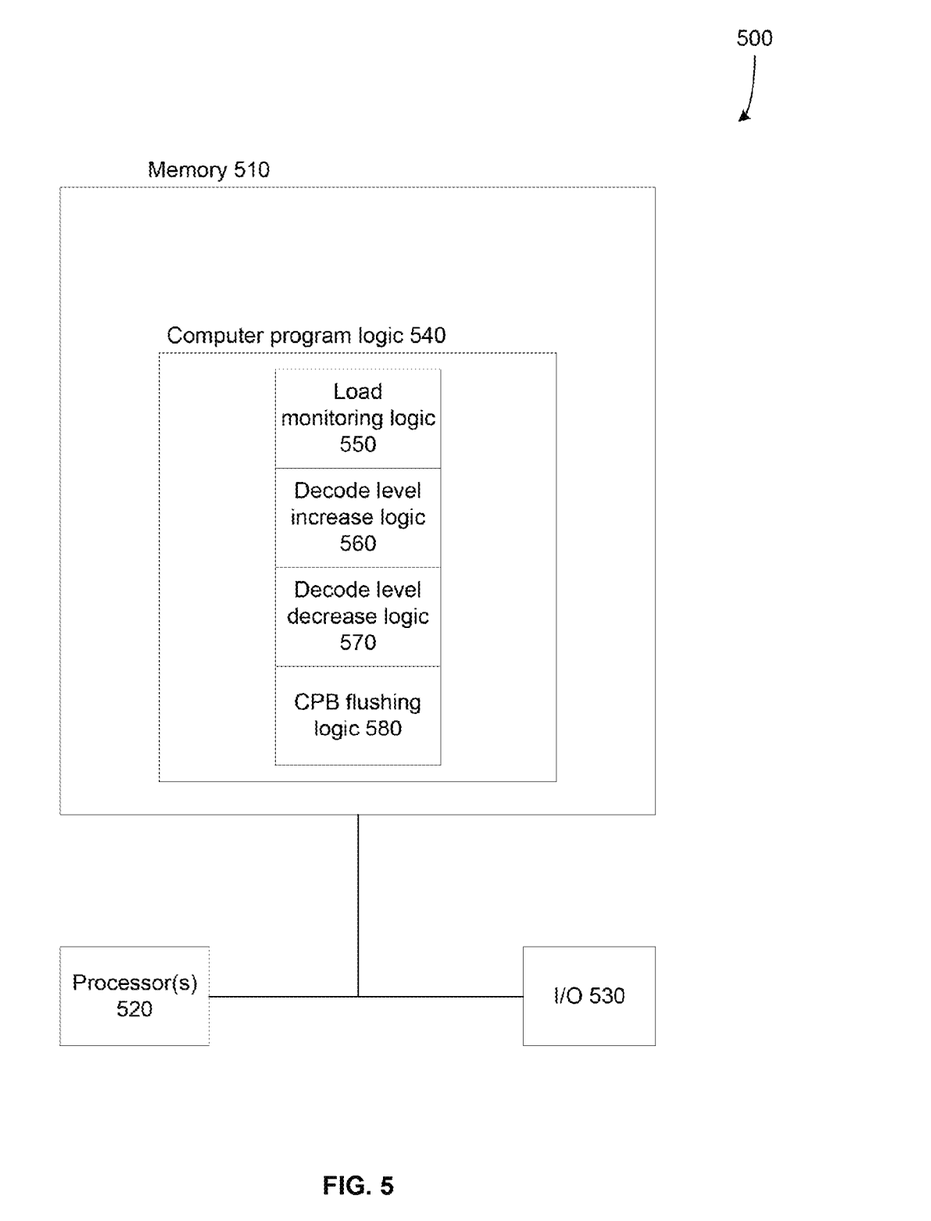
FIG. 5 is a block diagram illustrating an exemplary computing system with which the processing described herein may be implemented, according to an embodiment.

In the embodiment of FIG. 5, computer program logic 540 may include a module 550 responsible for monitoring the processing load of the system 500. As discussed above, this may include determining the average of the range of maximum excess delivery times and determining the percentage of dropped frames. Computer program logic 540 may also include a module 560 responsible for increasing the decode level for the next interval of video to be downloaded. Computer program logic 540 may include a module 570 responsible for decreasing the decode level for the next interval of video to be downloaded. Computer program logic 540 may also include a module 580 responsible for flushing the CPB under the circumstances described above. Note that the operation of modules 560-580 depends on the load conditions detected by load monitoring logic 550.

In an embodiment, constants and definitions in the processing described herein may also be programmable, along with a set of default parameters. These may include the following configuration parameters:
a) Enable/Disable load adaptive functionality: The client is configured to either enable or disable the load adaptive functionality. On some platforms such as consumer electronic devices, this functionality may be disabled.
b) Minimum amount of video data in the download buffer: The client should not flush the entire contents of the data buffer; a minimum amount of data may be retained, as discussed above, to prevent playback pause caused by re-buffering.
c) Maximum history period: The load adaptive streaming process may use recent history to predict the maximum sustainable decode level for the video system. This value sets the width of the window of recently elapsed time to predict performance of the video system.
d) Minimum observation period for choosing a higher decode level: The minimum time for a consistent performance increase which must be observed prior to up-switch to a higher decode level.
e) Minimum observation period before choosing a lower decode level: The minimum time that is observed prior to down-switch. In an embodiment, this duration is observed even it is leads to stutter.
f) Maximum number of frames in the sample collection buffer: The collection buffer, which shall be in the client video system, accumulates the measurements mentioned above. This value determines the number of measurement vectors that must be accumulated prior to sending the accumulated data to the load adaptive process.
g) Threshold to trigger a switch to a higher decoding level. In some embodiments this might be derived from the difference in resolution between the current level and next level.
h) Threshold to trigger a switch to a lower decoding level.
i) Frame drop threshold: The maximum percentage of dropped frames over an historical period. This value establishes a threshold for the flushing requirements, as discussed above.

Methods and systems are disclosed herein with the aid of functional building blocks illustrating the functions, features, and relationships thereof. At least some of the boundaries of these functional building blocks have been arbitrarily defined herein for the convenience of the description. Alternate boundaries may be defined so long as the specified functions and relationships thereof are appropriately performed.

While various embodiments are disclosed herein, it should be understood that they have been presented by way of example only, and not limitation. It will be apparent to persons skilled in the relevant art that various changes in form and detail may be made therein without departing from the spirit and scope of the methods and systems disclosed herein. Thus, the breadth and scope of the claims should not be limited by any of the exemplary embodiments disclosed herein.

What is claimed is:

1. A playback device configured to perform load and rate adaptive streaming, comprising:
   a processor configured via a load and rate adaptive streaming application to request segments of video from among a plurality of bitstreams, where the plurality of bitstreams are encoded at different decode levels in which resolution and bitrate vary between different decode levels;
   wherein the load and rate adaptive streaming application further configures the processor to:
      download and buffer a segment of video from a first bitstream at an initial decode level, where the segment of video comprises at least a plurality of frames of encoded video that are buffered in a coded picture buffer within the playback device;
      perform video processing to decode the plurality of frames of encoded video in the coded picture buffer in order to generate a plurality of frames of decoded video;
      store the plurality of frames of decoded video in a frame queue for display;
      accumulate measurements in a sample collection buffer, wherein the accumulated measurements comprise (i) a frame delivery time for each frame of decoded video in the frame queue and (ii) a number of dropped frames over a predefined period;
      when the number of dropped frames over the predefined period exceeds a frame drop threshold, flush a portion of the frames of encoded video buffered in the coded picture buffer; and
      when the accumulated measurements of the frame delivery times for the frames of the decoded video in the frame queue exceed a first threshold, download another segment of video from a second bitstream having a lower decode level than the decode level of the first bitstream.

2. The playback device of claim 1, wherein the processor is configured to download another segment of video from the second bitstream at the lower decode level after a minimum observation period.

3. The playback device of claim 1, wherein the load and rate adaptive streaming application further-configures the processor to:
when the playback device flushes the portion of the frames of encoded video buffered in the coded picture buffer, download a segment of video from the second bitstream at the lower decode level including a particular frame of encoded video that has a same play time as an encoded frame of video flushed from the coded picture buffer.

4. The playback device of claim 1, wherein the load and rate adaptive streaming application further configures the processor to:
accumulate and maintain a sorted list of frame delivery times in the sample collection buffer; and
determine when the accumulated measurements of the frame delivery times for the frames of the decoded video in the frame queue exceed the first threshold by comparing a selected range of the sorted list to the first threshold.

5. The playback device of claim 1, wherein the number of frames flushed from the coded picture buffer is dependent on the number of dropped frames over the predefined period.

6. The playback device of claim 1, wherein the load and rate adaptive streaming application further configures the processor to:
when the accumulated measurements of the frame delivery times for the frames of the decoded video in the frame queue are below a second threshold, download another segment of video from a third bitstream at a higher decode level; and
automatically calculate the second threshold such that the higher decode level does not exceed performance capabilities of the playback device.

7. The playback device of claim 6, wherein the load and rate adaptive streaming application further configures the processor to download another segment of video from the third bitstream at the higher decode level after a minimum observation period.

8. The playback device of claim 6, wherein the another segment of video is downloaded at the higher decoding level only when an average of the accumulated measurements of the frame delivery times is less than the second threshold by a predetermined amount.

9. The playback device of claim 6, wherein the load and rate adaptive streaming application further configures the processor to dynamically derive one or more of the first and second thresholds.

10. The playback device of claim 6, wherein one or more of the first and second thresholds is determined statically by a remote server in communication with the playback device.

11. The playback device of claim 6, wherein the load and rate adaptive streaming application further configures the processor to store one or more of the first and second thresholds locally in a storage of at the playback device for retrieval upon start up of the playback device.

12. The playback device of claim 1, wherein the initial decode level is equal to a maximum previous decode level.

13. A non-transitory machine readable medium storing a load and rate adaptive streaming application, the load and rate adaptive streaming application comprising sets of instructions for:
requesting segments of video from among a plurality of bitstreams, where the plurality of bitstreams are encoded at different decode levels in which resolution and bitrate vary between different decode levels;
downloading and buffering a segment of video from a first bitstream at an initial decode level, where the segment of video comprises at least a plurality of frames of encoded video that are buffered in a coded picture buffer within the playback device;
performing video processing to decode the plurality of frames of encoded video in the coded picture buffer in order to generate a plurality of frames of decoded video;
storing the plurality of frames of decoded video in a frame queue for display;
accumulating measurements in a sample collection buffer, wherein the accumulated measurements comprise (i) a frame delivery time for each frame of decoded video in the frame queue and (ii) a number of dropped frames over a predefined period;
when the number of dropped frames over the predefined period exceeds a frame drop threshold, flushing a portion of the frames of encoded video buffered in the coded picture buffer; and
when the accumulated measurements of the frame delivery times for the frames of the decoded video in the frame queue exceed a first threshold, downloading another segment of video from a second bitstream at a lower decode level having a lower resolution and bitrate than the resolution and bitrate of the initial decode level of the first bitstream.

14. The non-transitory machine readable medium of claim 13, wherein the set of instructions for downloading another segment of video from the second bitstream at the lower decode level is executed after a minimum observation period.

15. The non-transitory machine readable medium of claim 13, wherein the load and rate adaptive streaming application further comprises sets of instructions for:
when the playback device flushes the portion of the frames of encoded video buffered in the coded picture buffer, downloading a segment of video from the second bitstream at the lower decode level including a particular frame of encoded video that has a same play time as an encoded frame of video flushed from the coded picture buffer.

16. The non-transitory machine readable medium of claim 13, wherein the load and rate adaptive streaming application further comprises sets of instructions for:
accumulating and maintaining a sorted list of frame delivery times in the sample collection buffer; and
determining when the accumulated measurements of the frame delivery times for the frames of the decoded video in the frame queue exceed the first threshold by comparing a selected range of the sorted list to the first threshold.

17. The non-transitory machine readable medium of claim 13, wherein the number of frames flushed from the coded picture buffer is dependent on the number of dropped frames over the predefined period.

18. The non-transitory machine readable medium of claim 13, wherein the load and rate adaptive streaming application further comprises sets of instructions for:
when the accumulated measurements of the frame delivery times for the frames of the decoded video in the frame queue are below a second threshold, downloading another segment of video from a third bitstream at a higher decode level; and automatically calculating the second threshold such that the higher decode level does not exceed performance capabilities of the playback device.

19. The non-transitory machine readable medium of claim 18, wherein the downloading of the another segment of video at the higher decode level takes place after a minimum observation period.

20. The non-transitory machine readable medium of claim 18, wherein the another segment of video is downloaded at the higher decoding level only when an average of the accumulated measurements of the frame delivery times is less than the second threshold by a predetermined amount.

21. The non-transitory machine readable medium of claim 18, wherein the load and rate adaptive streaming application further comprises sets of instructions for dynamically deriving one or more of the first and second thresholds.

22. The non-transitory machine readable medium of claim 18, wherein one or more of the first and second thresholds is determined statically by a remote server in communication with the playback device.

23. The non-transitory machine readable medium of claim 18, wherein the load and rate adaptive streaming application further comprises sets of instructions for storing one or more of the first and second thresholds locally in a storage of the playback device for retrieval upon start up of the playback device.

24. The non-transitory machine readable medium of claim 13, wherein the initial decode level is equal to a maximum previous decode level.

25. A method for performing a load and rate adaptive streaming process, the method performed by a playback device, the method comprising:

requesting segments of video from among a plurality of bitstreams using a playback device, where the plurality of bitstreams are encoded at different decode levels in which resolution and bitrate vary between different decode levels;

downloading and buffering a segment of video from a first bitstream at an initial decode level using the playback device, where the segment of video comprises at least a plurality of frames of encoded video that are buffered in a coded picture buffer within the playback device;

performing video processing using the playback device to decode the plurality of frames of encoded video in the coded picture buffer in order to generate a plurality of frames of decoded video;

storing the plurality of frames of decoded video in a frame queue for display using the playback device;

accumulating measurements in a sample collection buffer using the playback device, wherein the accumulated measurements comprise (i) a frame delivery time for each frame of decoded video in the frame queue and (ii) a number of dropped frames over a predefined period;

when the number of dropped frames over the predefined period exceeds a frame drop threshold, flushing a portion of the frames of encoded video buffered in the coded picture buffer using the playback device; and when the accumulated measurements of the frame delivery times for the frames of the decoded video in the frame queue exceed a first threshold, downloading another segment of video from a second bitstream at a lower decode level than the decode level of the first bitstream using the playback device.

26. The method of claim 25, wherein the downloading of the another segment of video at the lower decode level takes place after a minimum observation period.

27. The method of claim 25 further comprising:

when the playback device flushes the portion of the frames of encoded video buffered in the coded picture buffer, downloading a segment of video from the second bitstream at the lower decode level including a particular frame of encoded video that has a same play time as an encoded frame of video flushed from the coded picture buffer.

28. The method of claim 25 further comprising:

accumulating and maintaining a sorted list of frame delivery times in the sample collection buffer using the playback device; and determining when the accumulated measurements of the frame delivery times for the frames of the decoded video in the frame queue exceed the first threshold using the playback device by comparing a selected range of the sorted list to the first threshold.

29. The method of claim 25, wherein the number of frames flushed from the coded picture buffer is dependent on the number of dropped frames over the predefined period.

30. The method of claim 25, further comprising:

when the accumulated measurements of the frame delivery times for the frames of the decoded video in the frame queue are below a second threshold, downloading another segment of video from a third bitstream at a higher decode level using the playback device; and automatically calculating the second threshold using the playback device such that the higher decode level does not exceed performance capabilities of the playback device.

31. The method of claim 30, wherein the downloading of the another segment of video at the higher decode level takes place after a minimum observation period.

32. The method of claim 30, wherein the another segment of video is downloaded at the higher decoding level only when an average of the accumulated measurements of the frame delivery times is less than the second threshold by a predetermined amount.

33. The method of claim 30 further comprising dynamically deriving one or more of the first and second thresholds.

34. The method of claim 30, wherein one or more of the first and second thresholds is determined statically by a remote server in communication with the playback device.

35. The method of claim 30 further comprising storing one or more of the first and second thresholds locally in a storage of the playback device.

36. The method of claim 30, wherein the initial decode level is equal to a maximum previous decode level.

* * * * *